United States Patent [19]

Catalin

[11] Patent Number: 5,398,275
[45] Date of Patent: Mar. 14, 1995

[54] METHOD AND APPARATUS FOR ACQUIRING IMAGES BY X-RAYS

[76] Inventor: Stoichita Catalin, 37, Avenue Louis Blanc, 94210 La Varenne, France

[21] Appl. No.: 111,165

[22] Filed: Aug. 24, 1993

[30] Foreign Application Priority Data

Aug. 26, 1992 [FR] France .......................... 92 10292

[51] Int. Cl.⁶ ............................................. H05G 1/64
[52] U.S. Cl. ................................. 378/98.8; 378/98.2
[58] Field of Search .................. 378/98.8, 98.2, 98, 378/62

[56] References Cited

U.S. PATENT DOCUMENTS

| | | | |
|---|---|---|---|
| 3,748,549 | 7/1973 | Milch et al. | 317/235 NA |
| 4,413,280 | 11/1983 | Alderstein et al. | 378/98.8 |
| 4,652,918 | 3/1987 | Liu et al. | 358/111 |
| 4,772,953 | 9/1988 | Geluk | 358/219 |
| 4,809,309 | 2/1989 | Beekmans | 378/99 |
| 4,907,252 | 3/1990 | Aichinger et al. | 378/99 |
| 4,952,794 | 8/1990 | Kemner et al. | 378/98.8 X |
| 4,991,192 | 2/1991 | Nishiki | 378/98.8 |
| 5,101,421 | 3/1992 | Nishiki | 378/98.8 |

FOREIGN PATENT DOCUMENTS

| | | |
|---|---|---|
| 0129451 | 12/1984 | European Pat. Off. . |
| 0208225 | 1/1987 | European Pat. Off. . |
| 3207085 | 9/1983 | Germany . |
| 9103745 | 3/1991 | WIPO . |
| 9213492 | 8/1992 | WIPO . |

*Primary Examiner*—David P. Porta
*Attorney, Agent, or Firm*—Nilles & Nilles

[57] ABSTRACT

A method of acquisition of images by X-rays consisting in exposing the object to be visualized to X-rays and producing from these rays by means of a scintillator screen with a strong remanence and of a charge-coupled device, electrical signals representative of the object, placing the scintillator screen upon the light-sensitive surface of the charge-coupled device and causing the latter to acquire the visible image from the scintillator through integration during the post-luminescence phase of the scintillator.

12 Claims, 3 Drawing Sheets

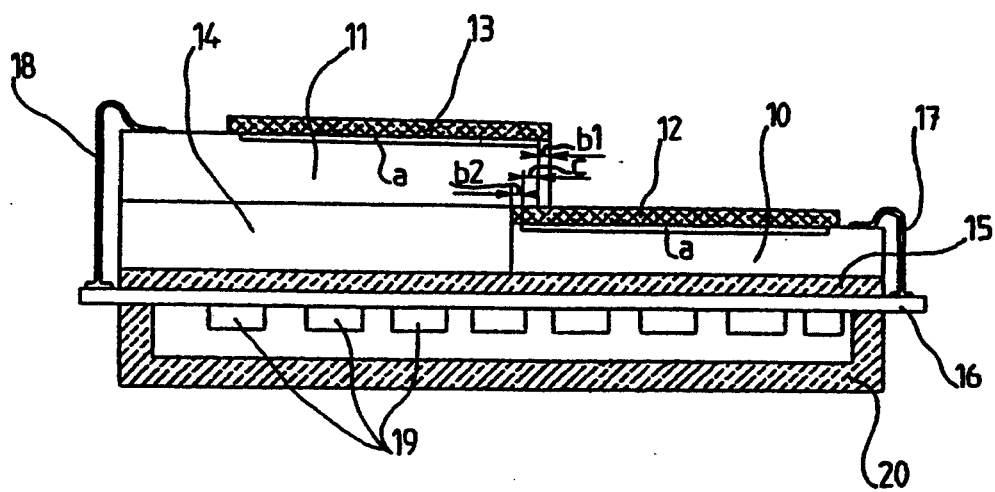
Fig:3
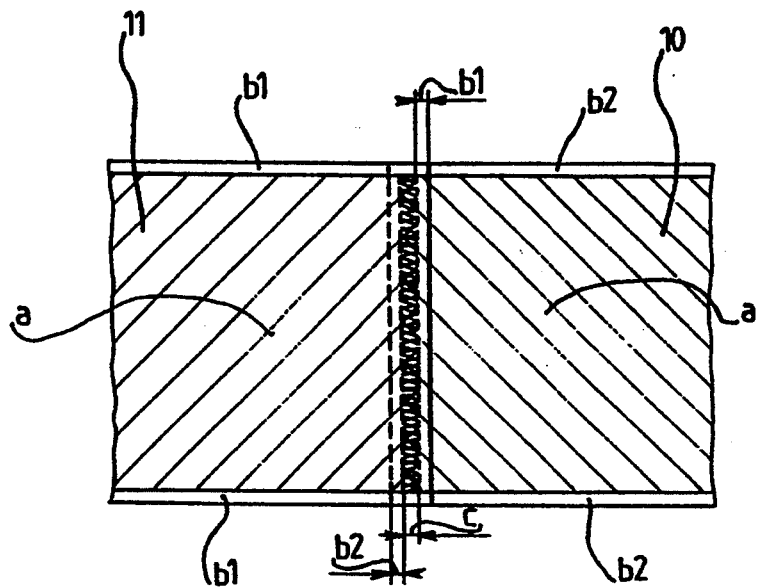
Fig:4

METHOD AND APPARATUS FOR ACQUIRING IMAGES BY X-RAYS

BACKGROUND OF THE INVENTION

1. Field of the Invention

The invention relates to a method of acquisition of images by X-rays, which consists in exposing the object to be visualized to X-rays and producing from these rays by means of a scintillator screen and of a charge-coupled device, electrical signals representative of the object as well as to an acquisition arrangement for performing this method.

2. Discussion of the Related Art

Image acquisition methods and arrangements of this type are already known. Indeed, upon the advent of image sensors in the form of charge-coupled devices hereinafter called CCD devices, it is possible to build photo-and-television cameras of small size which are very sensitive and usable in many fields. These devices are not only replacing the old vacuum valves as image sensors but they are at the same time imposing a digital structure to the chains of images which are using them. In the applications of images by means of X-rays, have been stated as being problems: the too small size of the sensors with respect to the size of the radiographics to be taken, the resolution less good than the conventional film and the destroying effect of the radiation upon the structure of the semi-conductor elements.

When looking into the solutions proposed in the patents EP-A-0 129,451; FR-A-2,333,404; EP-A-0 285,214; EP-A-0 372,122;; EP-A-0 373,717; EP-A-0 149,502; EP-A-0 279,294), it is found that to solve the size problem, optical systems should be called upon, which are transposing the image coming from the scintillator onto the surface of the CCD device while reducing it properly. To solve the problem of the bombardment with X-rays, the arrangement of the CCD device is based upon so as to reduce the exposed portion while going so far as to offset the CCD device at the end of an optical guide outside of the zone considered to be dangerous or screens transparent to light and sufficiently absorbing X-rays are used. The disadvantages are obvious: the price of the optical-system, the geometrical distorsions, the lowering of the sensitivity and of the resolution, the non-uniformity of illumination and in particular the gauge which may be deemed inadmissible in some applications. In the field of image pick-up sensors sensing through X-rays for intra-buccal uses for instance, the best compromise until now seems to be the use as an optical system, of a frusto-pyramidal doped reducing optical fiber which operates both as an image reducer and as a screen or shield against undesired radiation.

SUMMARY OF THE INVENTION

The object of the invention is to provide an image acquisition method and arrangement of the type referred to hereinabove which do not exhibit the above-mentioned inconveniences of the state of the art.

To reach this goal the method according to the invention is characterized in that one uses a scintillator screen having a strong remanence, one places the scintillator screen upon the light-sensitive surface of the charge-coupled device and one causes the charge-coupled device to acquire the image during the phase of post-luminescence of the scintillator.

According to another characterizing feature of the invention, one uses a source emitting X-rays the energy of which is high enough so that the charge-coupled device operates with a relatively low coefficient of absorption of the X-photons with the purpose of avoiding the damaging of this device.

According to another advantageous characterizing feature of the invention, one maintains the electrical field in the charge-coupled device during the radiation phase at a minimum value.

According to still another advantageous characterizing feature of the invention, the clearing phase of the charge-coupled device which precedes the integration phase is effected very quickly.

According to still a further advantageous characterizing feature of the invention, one removes the effect of the residual images upon the charge-coupled device by subtracting from the acquired image a residual image which has advantageously been set up just before the taking of radiography with the charge-coupled device not exposed to the X-rays.

The image acquisition arrangement for carrying out the method according to the invention is characterized in that the scintillator screen is a scintallator with a strong remanence, mounted upon the sensitive face of the charge-coupled device and in that the device for controlling the latter is so adapted that the integration of the image on the charge-coupled device be effected during the post-luminescence phase of the scintillator screen.

A first essential characterizing feature of the invention is therefore that it involves the use of a scintillator with a strong remanence which is laid down (pressed) directly upon the light-sensitive surface of the CCD device. By eliminating any intermediate optics between the scintillator and the CCD device, one removes all the geometrical distortions (the CCD device itself may be considered as being perfect from this point). Likewise one eliminates any light loss or diffusion between the conversion of the X-rays within the scintillator and the absorption within the CCD device, thereby improving the sensitiveness and the resolution. Also one eliminates any non-uniformity of zonal or pinpoint illumination (introduced in particular by the optical fibers). The gauge may be considered as being mimimum.

The destruction of the CCD device under the bombardment with X-rays is determined by the absorption of the X-photons into the silicon. The latter is determined by a spectral characteristic which has an approximate coefficient of 5/cm for the photons with an energy of 74.4 keV, of 50/cm for the photons with an energy of 12.4 keV and of 10,000/cm for those with an energy of 5 keV.

Therefore a second essential characterizing feature of the invention resides in the use of an X-rays source which does not emit low-energy radiations. It is found that this feature complies well with a biological radioprotection standards in the case of the medical radiology.

The absorption of an X-photon by an electron results in a first time in the ejection therefrom of its deep energy level in the conduction band where it has a substantial kinetic energy. Its energy is tranferred through collision to other electrons of the valency band while generating electron-hole pairs and then to the crystal lattice. The lattice receives this energy as heat, modification of crystal bonds (which means the occurence of centers of generation of recombinations similar as to the effect to doping impurities) or under certain still more mass transport destructing conditions. In the presence of an electric field, the charge carriers thus produced are accelerated and may generate through collision other charge carriers while multiplying themselves. The phenomenon is characterized by a so-called multiplication factor which depends in particular on the value of the applied electric field. One thus transfers the energy of the source of the applied field towards the lattice. For some values of the applied field, the multiplication factor reaches the infinite value and in such a case there is an avalanche multiplication, which phenomenon often is destructive.

The third characterizing feature of this method resides in the reduction of these effects of the radiation. For that purpose one polarizes the CCD device during the exposure to the X-rays so as to minimize the electric field in its structure.

Usually for an image pick-up, the CCD devices are passing through three different phases in accordance with the voltages applied to their electrodes: clearing, integration and reading. In the known apparatus, the exposure to the X-rays coincides with the integration period when the CDD is sufficiently polarized.

The present method is characterized by an offset between the image acquisition electric cycle and the exposure to the X-rays. During the exposure the image is stored onto the scintillator, the CCD being in the condition of a minimum electrical field. Just after the exposure, the CCD device is regularly polarized to pass through the three stages: very quick clearing, integration to receive the light amount (image) released by the scintillator being under process of relaxation and the reading. To reduce to a minimum the initialization time after the putting under voltage, the CCD device may be provided with special means for a quick clearing.

According to a fourth characterizing feature of the invention, a cycle of image acquisition through X-rays consists of four operating phases of the CCD device: minimum electric field, quick clearing, integration, reading.

The relaxation time of the scintillator should be long enough so that the light losses during the clearing of the CCD may be neglected. The relaxation time of the scintillator should be short enough so that the whole amount of light may be integrated without the own noise of the CCD becoming conspicuous. The saturation of the scintillator should be sufficient to yield a good signal level (see the saturation) at the output of the CCD device.

According to another essential characterizing feature of the invention, the integration of the image in the CCD device is effected during the post-luminescence phase of the scintillator which is activated by the X-rays.

In spite of the reduction of the electrical field within the structure of the CCD device during the exposure, the latter is subjected to a slowly gradual degradation due to the bombardment with X-rays. At the macroscopic level it is the shadow current which increases. Even if the CCD device is not exposed over its whole surface to the same radiation density (there is always in the center a more or less radioopaque object) after a substantial number of exposures, a nearly constant image generated by the darkness current of the CCD device itself will be added to the useful image. This imprint on the CCD device may be read without exposure to the light or to the X-rays.

One essential characterizing feature of the invention relates to the elimination of the effect of this residual image at each image pick-up. After the digitalization one proceeds with a cosmetic correction of the acquired image while taking moreover into account the imprint of the available shadow current in the digital memory which is actualized at each start of the digital system by effecting a reading cycle with the CCD device held in the shadow.

BRIEF DESCRIPTION OF THE DRAWINGS

The invention will be better understood and further objects, characterizing features, details and advantages thereof will appear more clearly in the course of the explanatory description which follows, made with reference to the attached diagrammatic drawings given by way of example only illustrating two embodiments of the invention and in which:

FIG. 3 illustrates a second embodiment of the invention;

FIG. 4 is a diagrammatic top view with parts cut away of both charge-coupled devices of FIG. 4;

DESCRIPTION OF THE PREFERRED EMBODIMENT

Figure 1:
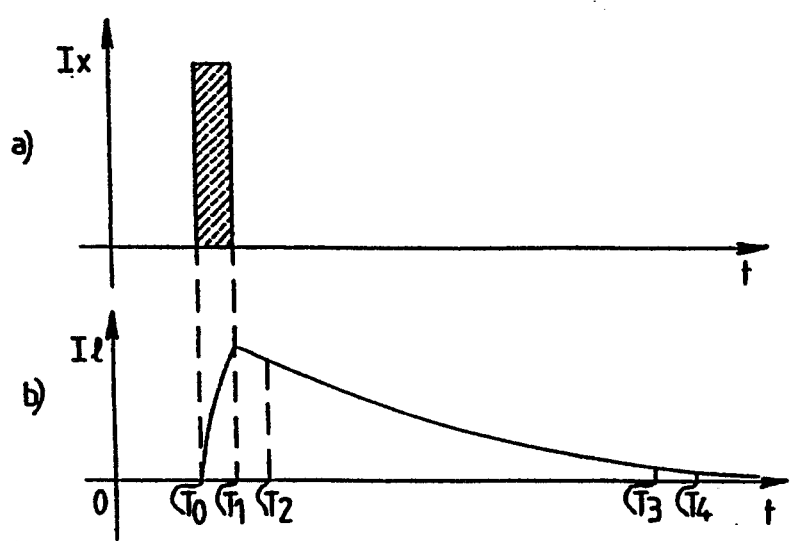
FIG. 1 illustrates an image acquisition cycle according to the method provided by the invention.

On FIG. 1 which illustrates an image acquisition cycle, there is seen at a the evolution with time of the intensity of the X-ray called $I_x$, in correlation with the light intensity emitted by the scintillator called I1 and shown at b. The scintillator is a scintillator having a strong remanence, i.e. higher than 0.1 sec, preferably of the order of from 0.5 to 0.9 sec, for a decrease down to the level of 10%. The radiation begins at the moment t0 and lasts until the moment t1. During this time, the CCD device is exposed to a minimum electrical field and the scintillator is gradually energized while emitting light. The maximum of light intensity coincides with the end of the X radiation, i.e. with the moment t1. Between the moments t1 an t2 is lapsing the quick clearing period during which the CCD charge-coupled device is emptied of the charges produced before the moment t1 and by the essential change of the polarization towards the state optimized for the work in the light. The integration period starts at the moment t2 and lasts until the essential relaxation of the scintillator, i.e. the moment t3 when the amount of light which remains to be emitted becomes negligible. After t3, the CCD device is cleared by the reading out of the image acquired during the integration.

On this figure it is seen that between the moments t0 and t1 some light is lost. To reduce this amount, it is necessary to reduce the time of exposure to the X-rays by increasing in a reverse proportion the intensity of the radiation. In other words one provides the dose necessary to the energizing of the scintillator rather by an increase of the intensity of the X-rays than of the time of exposure.

One also sees on FIG. 1 the importance of the clearing speed relating to the light losses between t1 and t2. The surface area lying between the curve of the light intensity and the time axis in the time interval t1–t2 on the one hand and on the other hand in the time interval t3–t4 determines a light amount which gives a vertical fuzziness to the image read out onto the CCD. This vertical fuzziness which incurs the risk of being visible is reduced and moreover withdrawn upon the cosmetic correction of the image according to the fourth operating characterizing feature cited above.

Figure 2:
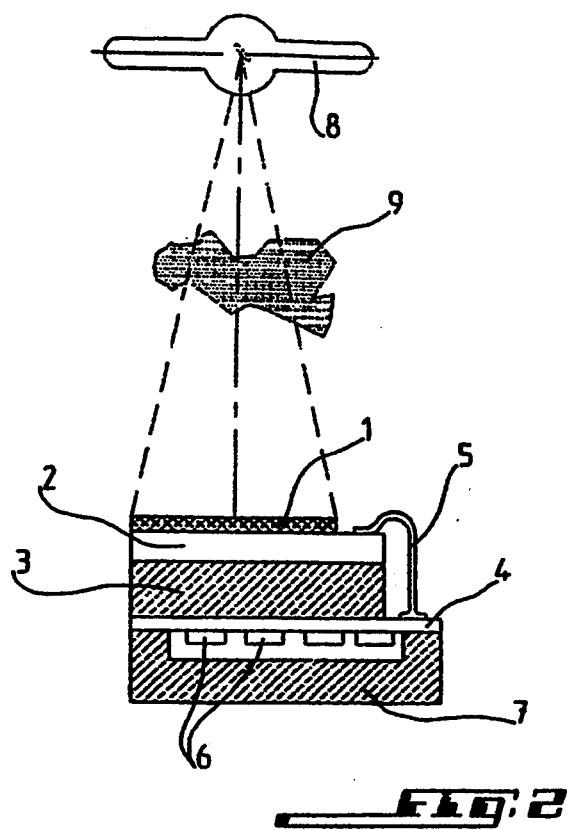
FIG. 2 diagrammatically shows a first embodiment of an image acquisition arrangement according to the invention.

FIG. 2 is a diagrammatic basic view in section through an arrangement of image acquisition through X-rays according to the invention which uses the post-luminescence of a scintillator and a charge-coupled device (CCD) 2. The scintillator 1 is adapted to convert the X-rays coming from the generator 8 of the X-rays which contain the image of the object 9 into visible light signals. The scintillator 1 is directly laid down upon the light-sensitive surface of the CCD device 2 or upon a separate support subsequently stuck with an optical adhesive onto the surface of this CCD device.

The assembly of the scintillator and of the CCD device is adhesively bonded onto a screen-support plate 3 made from a hard material. This part is determining for the mechanical behaviour of the whole assembly. To stop the X-photons which have not been absorbed within the scintillator or the silicon and to thus reduce the dose of X-radiation absorbed into the subject to be radiographed, one selects a material which in addition is radiation absorbing. It is appropriate to use for the screen-support 3 for instance slightly alloyed tungsten with an approximative thickness of 0.5 mm which also permits to electrically contact the CCD from behind.

The screen-support 3 carrying the assembly formed of the CCD device 2 and of the scintillator 1 is glued onto the surface of the support for the electric circuits 4. The latter has two (possible multilayer) faces and a small thickness since the mechanical strength is provided by the screen-support 3. The CCD device is connected to the device of circuits provided on the support 4 by means of the conductor wires 5. The reference 6 designates the components of the electronic device required for the operation of the CCD device. The connections of the electronic device of the pick-up sensor to the electronic digital chain for processing image signals is provided by means of a cable which is not shown on FIG. 2.

The assembly of the electronic components 6 is protected from the direct radiation passing through the CCD device by the screen-support 3 and against the radiation diffused by the environment by a cover 7 made from an absorbing material.

FIG. 3 shows a second embodiment of an X-rays image pick-up sensor according to the invention which allows to increase the sensitive image recording surface of the acquisition arrangement according to the invention. This second embodiment comprises two charge-coupled devices carrying the references 10 and 11, respectively, which are juxtaposed in overlapping relationship at their adjacent edges in a specific manner which will be explained later. The CCD devices 10 and 11 are covered each one with a scintillator screen 12 and 13, respectively. An intermediate part 14 is disposed between the CCD device 11 and a screen-support 15 onto wich the CCD device 10 is directly mounted. The bottom surface of the screen-support 15 carries the electrical circuit support 16 to which are electrically connected the CCD devices 11 and 12 by connections shown at 17 and 18. The electronic components of the device of electrical circuits are shown at 19 and a cover 20 is provided, which have the same function and characteristic as the cover according to FIG. 2.

Referring to FIGS. 3 and 4 one will explain the reason of the partial overlapping of the CCD devices 10 and 11. As it appears in particular from FIG. 4, a charge-coupled device comprises a sensitive zone a which is hatched and along its edges a dead zone shown in white. If both CCD devices 10 and 11 would be simply juxtaposed, the image would exhibit in its middle a substantially vertical band corresponding to the side dead zones of both devices.

To avoid this effect, both devices are so arranged that they are overlapping not only with their lateral dead zones b1, b2 but also with some columns of pixels of their sensitive zone a, thereby providing a zone of overlapping c, the width of which is exaggerated on the figure to facilitate the understanding of the invention. The latter is provided to cover the mounting tolerances and to be sure to be not the short of pixels between both images. Since the absorption of the X-rays in the assembly formed of the scintillator 13 and the device CCD 11 is low enough, some radiation is left for the shadowed area of the CCD device 10.

The electronic device and the digital system which are associated with the pick-up sensor according to FIG. 3 have thus to pratically manage or monitor two images with a band common to the adjacent edges of the latters. The overall image is restored after having digitalized both individual images and effected a specific treatment during which one corrects through multiplication with a predetermined coefficient the data content of the zone b1 of the CCD device 10 whereas the data of the zone c are removed, the zone b2 anyway containing no information since it is a dead zone. This correction is made by the software within the scope of a cosmetic processing of the image and the coefficient of multiplication as well as the parameters required for this operation may be determined once for all during the manufacture by gauging and stored within the memory of the data processing device. But one could also determine these parameters dynamically upon each image pick-up by determining the shadow of the CCD device 11 in the image coming from the CCD device 10. This second method is more precise since it eliminates the possible offset between two image halfs which could be due to a modification of the angle of incidence of the X-rays upon the pick-up sensor. The impact of the angle of incidence could besides be neglected by using a scintillator-CCD device assembly thin enough so that the zones b and c on FIG. 4 do pratically not vary in accordance with a modification of the angle of incidence.

Figure 5:
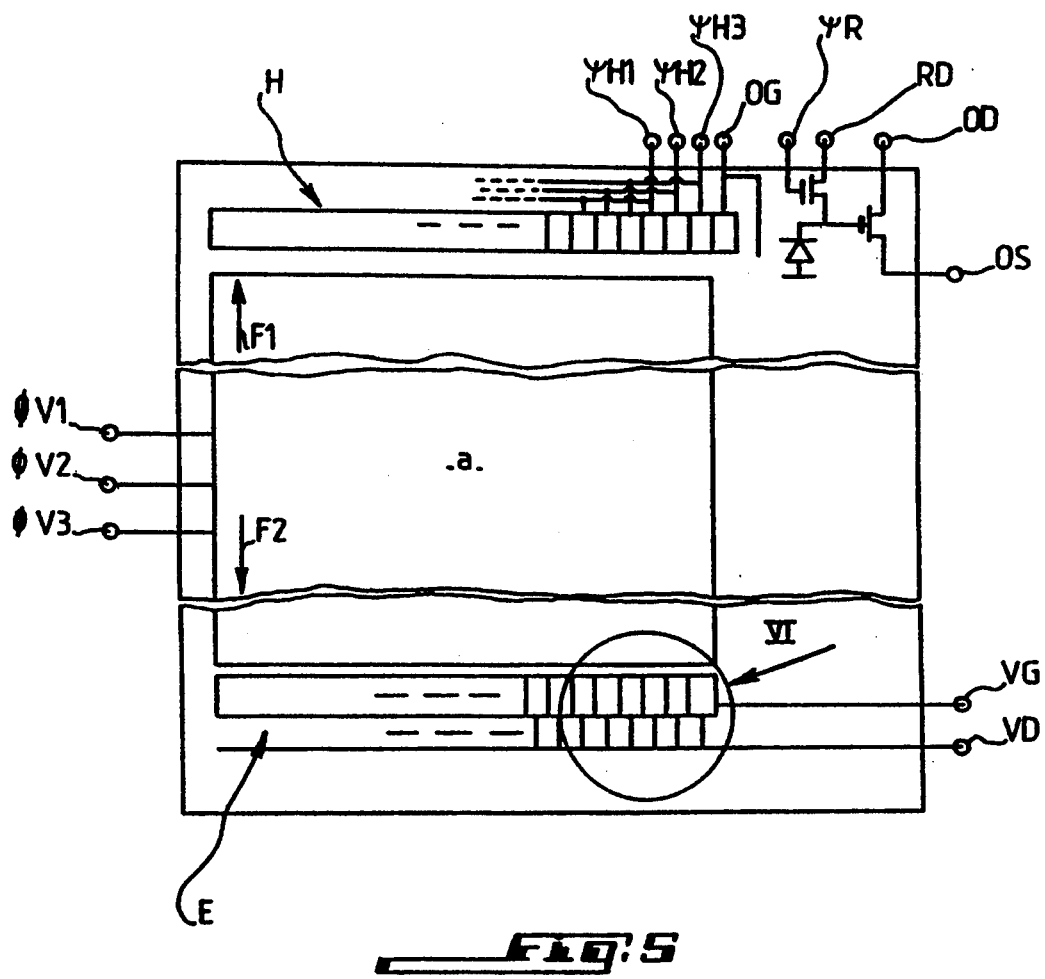
FIG. 5 is a diagrammatic view of a charge-coupled device showing an example allowing a quick clearing according to the invention.
Figure 6:
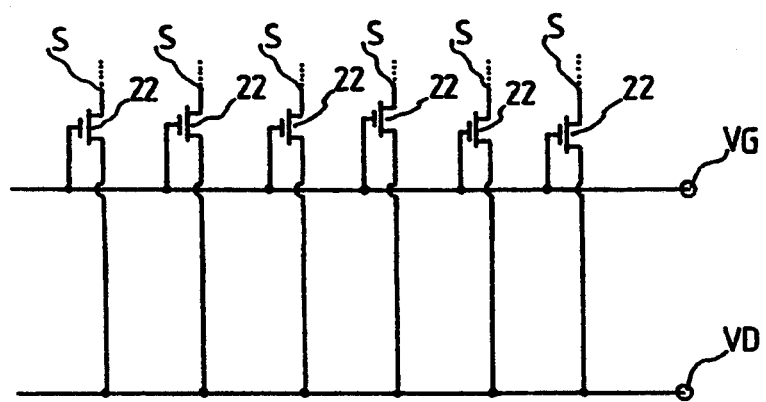
FIG. 6 is a view on a largest scale of the detail circled at VI on FIG. 5.

Referring to FIGS. 5 and 6, one will describe a method allowing a quick clearing of a charge-coupled device with the purpose of reducing the period t1–t2 on FIG. 1. FIG. 5 shows the electric diagram of a charge-coupled device. The upper portion of this diagram is known. The reference H designates the register for the output of the data stored in the pixels in the sensitive zone c of the charge-coupled device. By suitably controlling the potentials $\phi V1$, $\phi V2$ and $\phi V3$, in a manner known per se one displaces the rows of pixels stepwise upwards in the direction of the arrow F1 in order that they successively arrive into the output register H. The data thus entered into the register are subsequently taken out thereof in a stepwise manner by suitably controlling the potentials shown. On this figure $\psi H1$, $\psi H2$, $\psi H3$ designate the horizontal phase potentials, OG designates the output register grid, $\psi R$ and RD designate the grid and the drain of the resetting transistor, OD and OS designate the drain and the source of the output transistor.

The measure which is used by the invention relates to the quick clearing of the charges within the charge-coupled device. For that purpose one changes the phase relationship between the potentials $\phi V1$, $\phi V2$ and $\phi V3$ so as to displace the rows of pixels downwards in the direction of the arrow F2 so as to introduce the rows into a clearing register E which in the example shown is formed of a row of transistor switches 22 of the MOS type. The number of the transistors is equal to the number of columns of the charge-coupled device. The rows of transistors-switches is parallel to the output register but located at the other end of the columns. The drains of the transistors are mounted in parallel relationship and connected to the reset reference terminal of the device carrying the reference VD. The sources S of the transistors are connected each one to the end of a column as this is shown on FIG. 6 by dots. The gate electrodes are mounted in parallel relationship and connected to an external control electrode designated by VG.

During the integration or the reading out of the charge-coupled device, the control electrodes or gates of the transistors are biased to provide for the blocking thereof. To obtain a quick clearing, one controls the gates so that the transistors-switches 22 become conducting at the same time. Thus one clears the charge-coupled device through mere vertical downwards displacement row by row without being compelled to carry out the horizontal displacement as in a reading-out cycle. This permits to accelerate tenths of times and even hundreds of times the clearing of the CCD device.

It is obvious that multiple modifications may be brought to the invention such as shown on the figures. For example the number of charge-coupled devices could be greater than two and selected in accordance with the size of the desired image surface on condition of providing the mutual overlapping of the adjacent edges of the different devices, such as described above with reference to FIGS. 3 and 4.

What is claimed is:

1. A method of acquiring a visible radiographic image of an object comprising the steps of:
   placing a scintillator upon a light-sensitive surface of a charge-coupled device, the scintillator having a strong remanence so as to present an extended post-luminescence phase;
   exposing the object to X-rays, thereby causing the scintillator to emit light;
   minimizing an electric field in the charge-coupled device during the exposing step thereby reducing the degradation of the charge-coupled device caused by the X-rays;
   integrating the light emitted by the scintillator during the post-luminescence phase of the scintillator;
   reading-out electrical signals from the charge-coupled device based on the integrating step, the signals being representative of the visible radiographic image; and
   converting the electrical signals to the visible radiographic image.

2. A method according to claim 1, wherein the energy of the X-rays is high enough in order that the charge-coupled device operates with a relatively small coefficient of absorption of X-ray-photons of the X-rays, thereby further reducing the degradation of the charge-coupled device.

3. A method according to claim 1, wherein the integrating step is preceded by a clearing step in which the charge-coupled device is emptied of charges, and wherein the clearing step is effected at the maximum speed permitted by the charge-coupled device.

4. A method according to claim 3, wherein the exposing step is followed by the clearing step, wherein the clearing step is followed by the integrating step, and wherein the integrating step is followed by the reading-out step.

5. A method of acquiring a visible radiographic image of an object comprising the steps of:
   placing a scintillator upon a light-sensitive surface of a charge-coupled device, the scintillator having a strong remanence so as to present an extended post-luminescence phase;
   exposing the object to X-rays, thereby causing the scintillator to emit light;
   integrating the light emitted by the scintillator during the post-luminescence phase of the scintillator, thereby reducing the degradation of the charge-coupled device caused by the X-rays;
   reading-out electrical signals from the charge-coupled device based on the integrating step, the signals being representative of the visible radiographic image; and
   converting the electrical signals to the visible radiographic image;
   wherein each acquired image is corrected by subtraction therefrom of an image imprinted with the noise of the charge-coupled device, the noise-imprinted image being obtained by a preliminary reading-out of the charge-coupled device without radiation.

6. A device for acquiring a radiographic image of an object comprising:
   a source for emitting X-rays to which the object is exposed;
   a first charge-coupled device;
   a first scintillator, the first scintillator having a strong remanence so as to present an extended post-luminescence phase, the first scintillator emitting light in response to the X-rays, and the first scintillator being placed upon a light-sensitive surface of the first charge-coupled device;
   a controller for controlling the first charge-coupled device, the controller being adapted so as to cause an integration of the light emitted by the scintillator during the post-luminescence phase of the scintillator screen; and
   a radiographic imaging device, connected to the controller, for displaying the radiographic image.

7. A device according to claim 6, further comprising:
   a second charge-coupled device; and
   a second scintillator, the second scintillator being placed upon a light-sensitive surface of the second charge-coupled device;
   wherein adjacent lateral zones of the first and second charge-coupled devices are mutually overlapping to avoid the occurrence of void bands in the image.

8. A device according to claim 7, further comprising a screen-support which is made from a hard material and which supports at least one of the first and second charge-coupled devices.

9. A device according to claim 7, further comprising a digital device for assembling into one single image individual images obtained by the first and second charge-coupled devices.

10. A device according to claim 7, further comprising a screen-support which is made from an X-ray absorbent material and which supports at least one of the first and second charge-coupled devices.

11. A device according to claim 6, further comprising a support for electrical circuits and electronic components necessary for the operation of the first charge-coupled device.

12. A device according to claim 11, further comprising a cover for protecting the electronic components against the X-rays diffused by the environment, the cover being made from an X-ray absorbent material.

* * * * *